United States Patent
Jurik et al.

(10) Patent No.: US 10,161,595 B2
(45) Date of Patent: Dec. 25, 2018

(54) COLLIMATION SYSTEM FOR AN LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem ( * ) Notice: Subject to any disclaimer, the term of this patent is extended or adjusted under 35 U.S.C. 154(b) by 0 days.

(21) Appl. No.: 14/386,317

(22) PCT Filed: Mar. 18, 2013

(86) PCT No.: PCT/US2013/032851
§ 371 (c)(1),
(2) Date: Sep. 18, 2014

(87) PCT Pub. No.: WO2013/142437
PCT Pub. Date: Sep. 26, 2013

(65) Prior Publication Data
US 2015/0316229 A1    Nov. 5, 2015

Related U.S. Application Data

(60) Provisional application No. 61/612,376, filed on Mar. 18, 2012.

(51) Int. Cl.
*F21V 5/00* (2018.01)
*F21V 5/04* (2006.01)
(Continued)

(52) U.S. Cl.
CPC .............. *F21V 5/046* (2013.01); *F21V 5/007* (2013.01); *F21V 5/04* (2013.01); *F21V 7/0083* (2013.01);
(Continued)

(58) Field of Classification Search
CPC ...... F21V 5/046; F21V 17/06; F21V 2101/02; F21V 5/04; F21Y 2105/001; F21K 99/00
(Continued)

(56) References Cited

U.S. PATENT DOCUMENTS

| | | | |
|---|---|---|---|
| 5,704,709 A * | 1/1998 | Zwick | F21S 48/215 257/E33.072 |
| 7,461,960 B2 * | 12/2008 | Opolka | F21L 4/00 359/728 |

(Continued)

FOREIGN PATENT DOCUMENTS

| | | | | |
|---|---|---|---|---|
| EP | 1710495 A1 | 10/2006 | | |
| EP | 2636943 A1 * | 9/2013 | ............ | F21V 7/0083 |

(Continued)

OTHER PUBLICATIONS

PCT International Search Report; Application No. PCT/US2013/032851; dated Jul. 19, 2013; 5 pages.
(Continued)

*Primary Examiner* — Alexander K Garlen
*Assistant Examiner* — Colin J Cattanach
(74) *Attorney, Agent, or Firm* — Conley Rose, P.C.; Grant Rodolph; Brooks W Taylor

(57) ABSTRACT

An automated luminaire with an array of light sources configured in a plurality of primary TIR optics with central light blocks. The light blocks are configured to block or redirect light beam at angles likely to cause undesirable light spill.

19 Claims, 9 Drawing Sheets

(51) Int. Cl.
| | |
|---|---|
| *F21V 7/00* | (2006.01) |
| *F21V 11/06* | (2006.01) |
| *F21V 17/00* | (2006.01) |
| *F21V 17/06* | (2006.01) |
| *F21V 21/30* | (2006.01) |
| *G02B 19/00* | (2006.01) |
| *F21Y 105/10* | (2016.01) |
| *F21Y 113/13* | (2016.01) |
| *F21Y 115/10* | (2016.01) |
| *F21W 131/406* | (2006.01) |

(52) U.S. Cl.
CPC ............ *F21V 7/0091* (2013.01); *F21V 11/06* (2013.01); *F21V 17/06* (2013.01); *G02B 19/0028* (2013.01); *G02B 19/0066* (2013.01); *F21V 17/005* (2013.01); *F21V 21/30* (2013.01); *F21W 2131/406* (2013.01); *F21Y 2105/10* (2016.08); *F21Y 2113/13* (2016.08); *F21Y 2115/10* (2016.08)

(58) Field of Classification Search
USPC ............... 362/237, 241, 249.02, 311.02, 800
See application file for complete search history.

(56) References Cited

U.S. PATENT DOCUMENTS

| | | | | |
|---|---|---|---|---|
| 7,513,656 B2* | 4/2009 | Park | ............ | F21V 5/04 257/95 |
| 7,580,192 B1* | 8/2009 | Chu | ............ | F21V 5/04 359/641 |
| 7,654,690 B2* | 2/2010 | Chuan | ............ | F21K 9/00 362/240 |
| 7,878,695 B2* | 2/2011 | Ishida | ............ | F21S 41/143 362/539 |
| 7,972,040 B2* | 7/2011 | Li | ............ | F21K 9/137 362/237 |
| 8,272,759 B2* | 9/2012 | Chou | ............ | F21V 5/007 362/235 |
| 8,366,297 B2* | 2/2013 | Kretschmann | ............ | F21S 4/22 362/249.02 |
| 8,794,792 B1* | 8/2014 | Moghal | ............ | F21V 29/507 362/240 |
| 9,347,642 B2* | 5/2016 | Catalano | ............ | F21V 5/04 |
| 2002/0080621 A1* | 6/2002 | Ogura | ............ | H04N 1/031 362/551 |
| 2003/0137838 A1* | 7/2003 | Rizkin | ............ | E01F 9/065 362/240 |
| 2005/0265035 A1* | 12/2005 | Brass | ............ | F21L 4/00 362/451 |
| 2006/0171151 A1 | 8/2006 | Park et al. | | |
| 2006/0238884 A1* | 10/2006 | Jang | ............ | F21V 5/04 359/653 |
| 2006/0291206 A1* | 12/2006 | Angelini | ............ | F21V 5/04 362/244 |
| 2007/0114551 A1* | 5/2007 | Kawaguchi | ............ | F21K 9/00 257/98 |
| 2007/0230171 A1* | 10/2007 | Hiratsuka | ............ | F21V 7/0083 362/235 |
| 2008/0030993 A1* | 2/2008 | Narendran | ............ | G02B 6/0003 362/296.07 |
| 2008/0043466 A1* | 2/2008 | Chakmakjian | ............ | F21V 5/007 362/237 |
| 2008/0047605 A1* | 2/2008 | Benitez | ............ | F24J 2/06 136/259 |
| 2008/0073663 A1* | 3/2008 | Chang | ............ | H01L 33/58 257/99 |
| 2008/0123341 A1* | 5/2008 | Chiu | ............ | F21K 9/233 362/294 |
| 2008/0316761 A1* | 12/2008 | Minano | ............ | G02B 3/0068 362/518 |
| 2009/0071467 A1* | 3/2009 | Benitez | ............ | F24J 2/085 126/685 |
| 2009/0109689 A1* | 4/2009 | Boyer | ............ | F21V 7/005 362/341 |
| 2009/0180287 A1* | 7/2009 | Tang | ............ | F21K 9/00 362/351 |
| 2009/0231739 A1* | 9/2009 | Winston | ............ | G02B 17/0856 359/853 |
| 2010/0103663 A1* | 4/2010 | Kubis | ............ | H05B 33/0887 362/231 |
| 2010/0110660 A1 | 5/2010 | Brukilacchio | | |
| 2010/0165599 A1* | 7/2010 | Allen | ............ | F21K 9/00 362/84 |
| 2010/0188837 A1* | 7/2010 | Van Bommel | ............ | G02F 1/29 362/84 |
| 2010/0204841 A1* | 8/2010 | Chemel | ............ | H05B 33/0863 700/282 |
| 2010/0225639 A1* | 9/2010 | Kubis | ............ | G09F 9/33 345/214 |
| 2010/0296296 A1* | 11/2010 | Sun | ............ | B41J 2/17596 362/297 |
| 2011/0089453 A1* | 4/2011 | Min | ............ | F21V 5/04 257/98 |
| 2012/0091917 A1* | 4/2012 | Vinther | ............ | F21S 10/023 315/312 |
| 2012/0175655 A1* | 7/2012 | Cheng | ............ | F21V 5/04 257/98 |
| 2012/0268930 A1* | 10/2012 | Lu | ............ | F21K 9/137 362/235 |
| 2012/0287613 A1* | 11/2012 | Hamel | ............ | F21V 29/004 362/184 |
| 2013/0010471 A1* | 1/2013 | Dalsgaard | ............ | F21V 21/30 362/249.1 |
| 2013/0033865 A1* | 2/2013 | Vinther | ............ | F21V 7/0083 362/235 |
| 2013/0208478 A1* | 8/2013 | Bowden | ............ | F21V 7/06 362/260 |

FOREIGN PATENT DOCUMENTS

| | | | | |
|---|---|---|---|---|
| WO | WO2011033424 A1 * | 3/2011 | ............ | G02F 13/04 |
| WO | WO 2011121283 A1 * | 10/2011 | ............ | F21K 9/00 |
| WO | WO2011131198 A1 * | 10/2011 | ......... | H05B 33/0857 |

OTHER PUBLICATIONS

PCT Written Opinion of the International Searching Authority; Application No. PCT/US2013/032851; dated Jul. 19, 2013; 8 pages.

* cited by examiner

COLLIMATION SYSTEM FOR AN LED LUMINAIRE

CROSS-REFERENCE TO RELATED APPLICATIONS

This application is a filing under 35 U.S.C. 371 of International Application No. PCT/US2013/032851 filed Mar. 18, 2013 entitled, "Improved Collimation System for an LED Luminaire", which claims priority to U.S. Provisional Application No. 61/612,376 filed on Mar. 18, 2012 entitled, "Improved Collimation System for an LED Luminaire", both of which are incorporated by reference herein as if reproduced in their entirety.

TECHNICAL FIELD OF THE DISCLOSURE

The present disclosure generally relates to a method for controlling the light output from an array of light emitting diodes (LEDs) when used in a light beam producing luminaire, specifically to a method relating to preventing spill light and for controlling the beam angle of the array.

BACKGROUND OF THE DISCLOSURE

High power LEDs are commonly used in luminaires for example in the architectural lighting industry in stores, offices and businesses as well as in the entertainment industry in theatres, television studios, concerts, theme parks, night clubs and other venues. These LEDs are also being utilized in automated lighting luminaires with automated and remotely controllable functionality. For color control it is common to use an array of LEDs of different colors. For example a common configuration is to use a mix of Red, Green and Blue LEDs. This configuration allows the user to create the color they desire by mixing appropriate levels of the three colors. For example illuminating the Red and Green LEDs while leaving the Blue extinguished will result in an output that appears Yellow. Similarly Red and Blue will result in Magenta, and Blue and Green will result in Cyan. By judicious control of these three controls the user may achieve any color they desire. More than three colors may also be used and it is well known to add an Amber or White LED to the Red, Green and Blue to enhance the color mixing and improve the gamut of colors available.

The differently colored LEDs may be arranged in an array in the luminaire where there is physical separation between each LED, and this separation, coupled with differences in die size and placement for each color, may affect the spread of the individual colors and results in objectionable spill light and color fringing of the combined mixed color output beam. It is common to use a lens or other optical device in front of each LED to control the beam shape and angle of the output beam; however these optical devices commonly have differing effect for different colors and color fringing or other aberrations may be visible in the output beam. It would be advantageous to have a system where stray light and aberrations are well controlled.

There is a need for a beam control system for an LED array based luminaire which provides improvements in spill light reduction and beam angle control.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to a method for controlling the light output from an array of LEDs when used in a light beam producing luminaire, specifically to a method relating to preventing spill light and for controlling the beam angle of the array.

Figure 1:
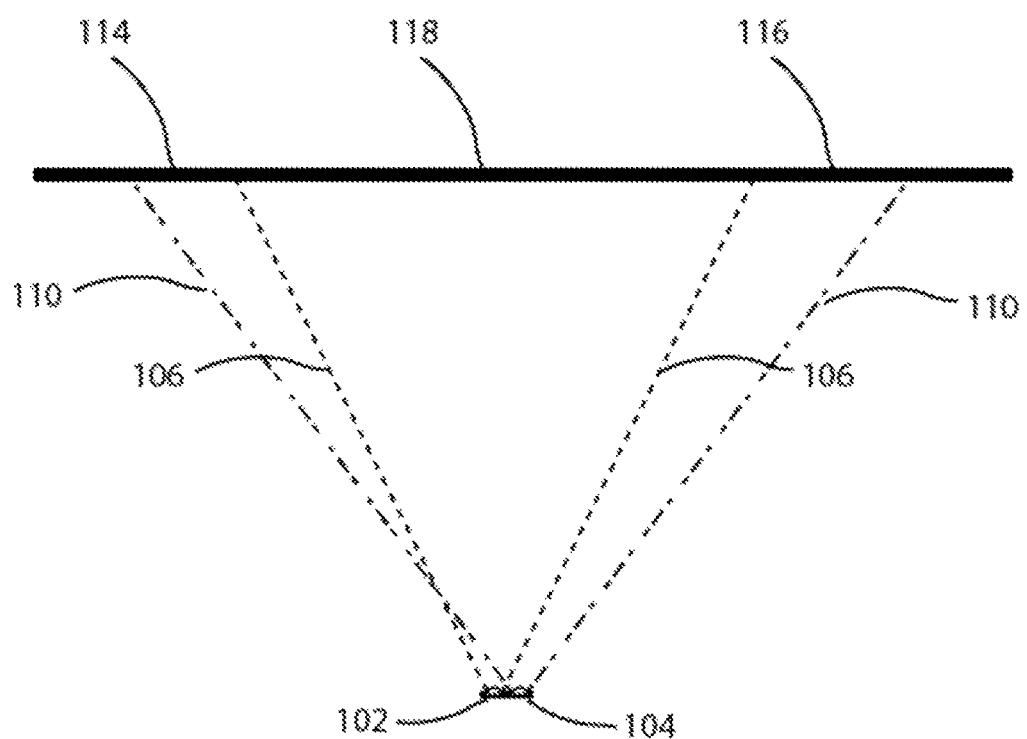
FIG. 1 illustrates a prior art system.

FIG. 1 illustrates a prior art system showing two LEDs as may be used in a luminaire. LED 102 and LED 104 may be of differing colors and, due to the different optical properties and construction of the LED dies, produce light beams 106 and 110 that differ in beam spread. The differing beam spreads mean that the light beams from LEDs 102 and 104 will impinge on an illuminated object 118 in such a way that areas 114 and 116 of the object are illuminated by a single LED only rather than the desired mix of both. This results in areas 114 and 116 being colored differently from the central mixed area and appearing as colored fringes. Only Two (2) LEDs are illustrated in FIG. 1 for clarity and simplicity. It should be appreciated that the same problem exists with systems incorporating more than two colors of LED.

Figure 2:
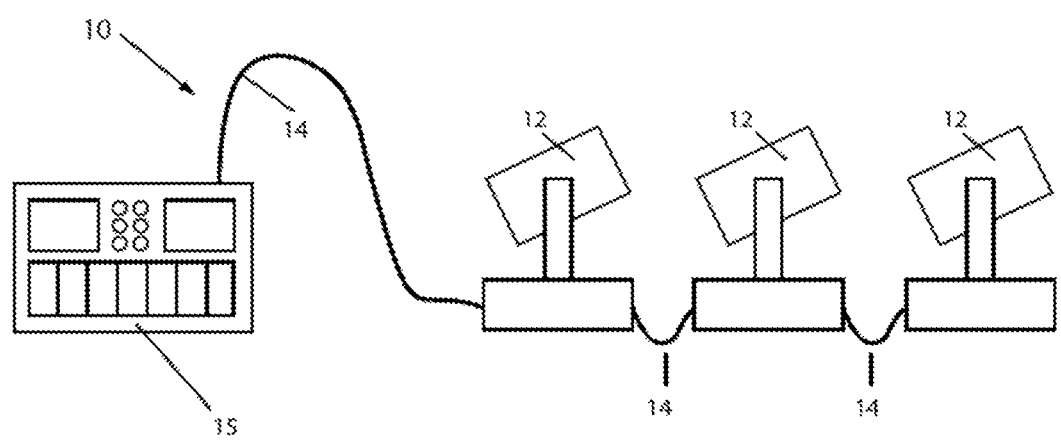
FIG. 2 illustrates a typical automated luminaire system.

FIG. 2 illustrates a typical multiparameter automated luminaire system 10. These systems commonly include a plurality of multiparameter automated luminaires 12 which typically each contain on-board an array of LEDs, and electric motors coupled to mechanical drive systems and control electronics (not shown). In addition to being connected to mains power either directly or through a power distribution system (not shown), each automated luminaire 12 is connected in series or in parallel to data link 14 via one or more control desk(s) 15. The luminaire system 10 is typically controlled by an operator through the control desk 15. Consequently, to effect this control, both the control desk 10 and the individual luminaires 12 typically include electronic circuitry as part of the electromechanical control system for controlling the automated lighting parameters.

Figure 3:
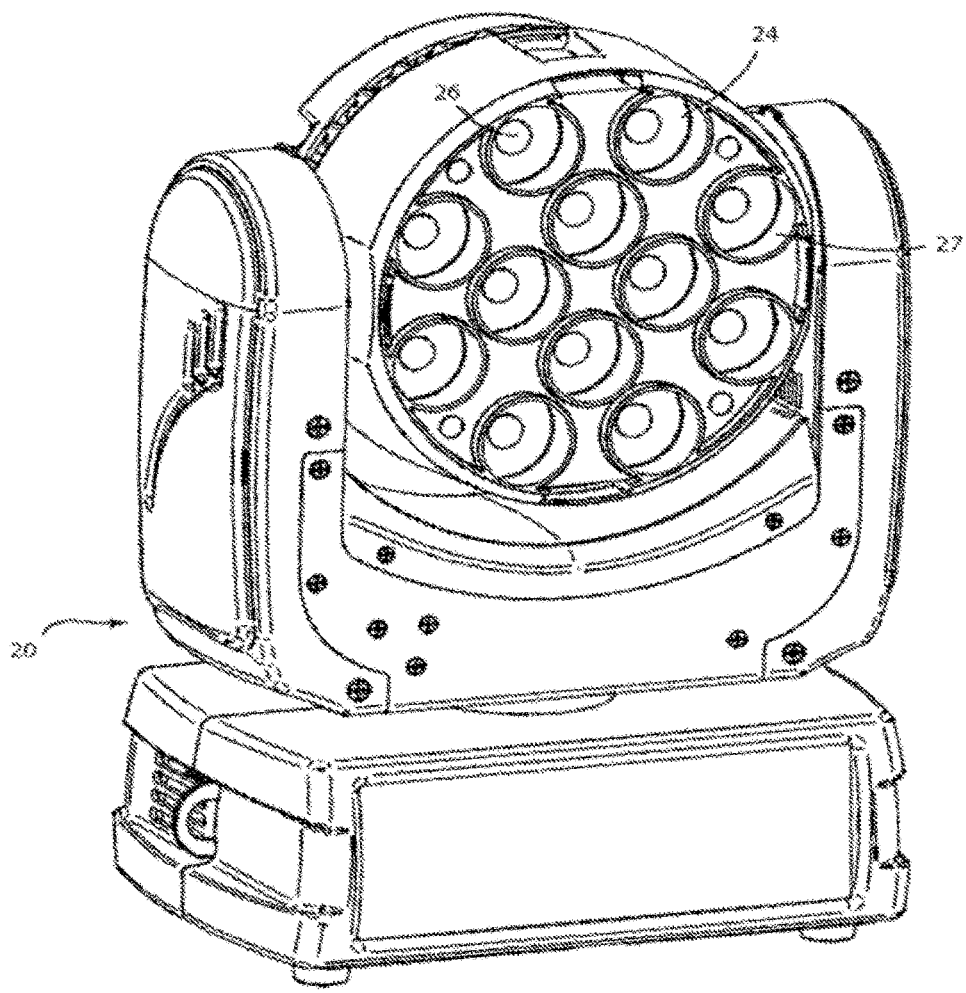
FIG. 3 illustrates an embodiment of the disclosure as fitted to an automated luminaire.

FIG. 3 illustrates an embodiment of the disclosure as fitted to an automated luminaire. Luminaire 20 contains multiple LED modules each of which is fitted with primary optics 24, central spill light blocker 26, and an array of small louver masks 27. Louver masks 27 may have different heights and widths. By changing the louver masks 27 to masks with different heights of louver array the user may control the beam angle, stray light, and color fringing of the luminaire in addition to that control provided by the central spill light blocker 26, described in greater detail below. Louver masks 27 may further provide mechanical protection and dust exclusion for the LED modules.

Figure 4:
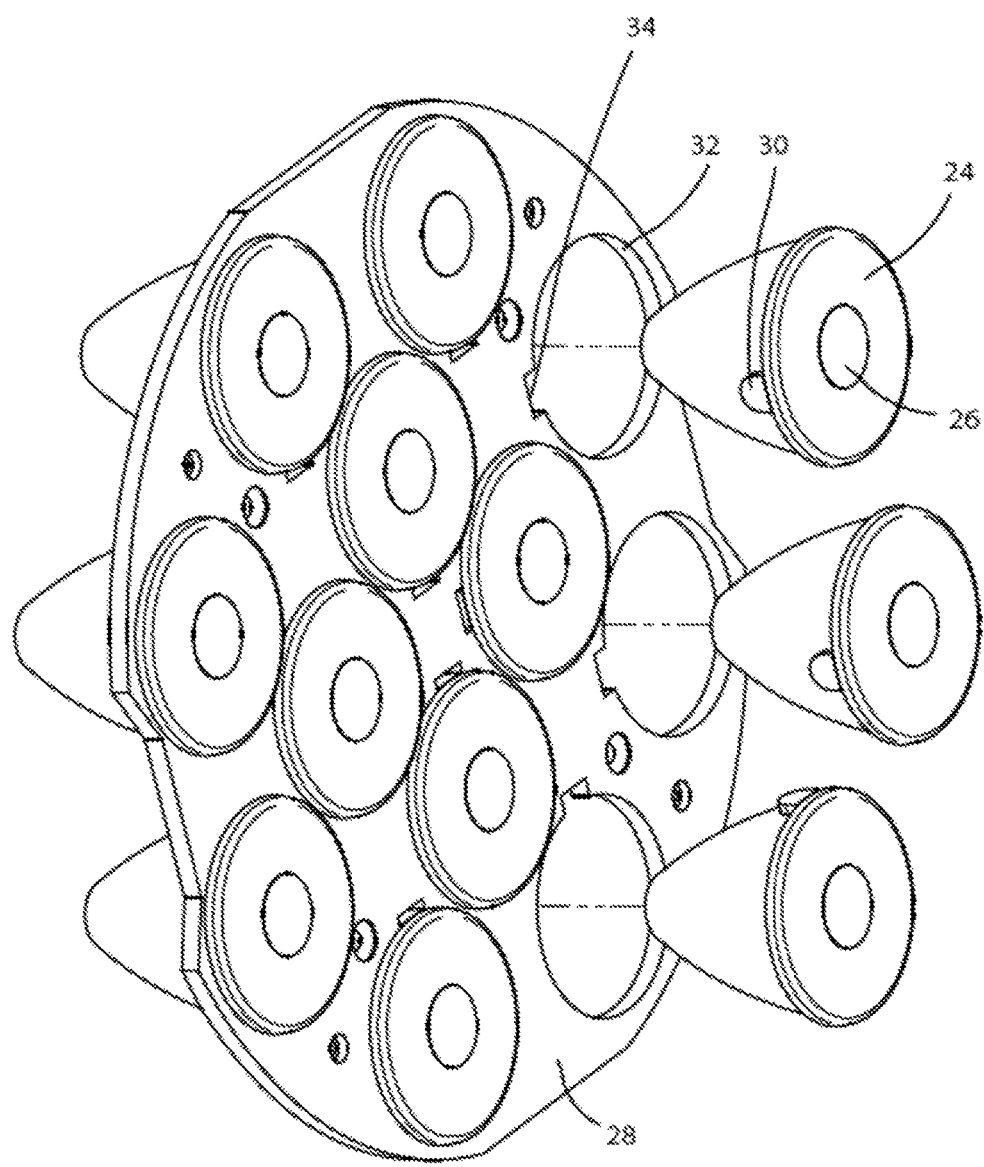
FIG. 4 illustrates a detailed view of an embodiment of the disclosure.

FIG. 4 illustrates a detailed view of an embodiment of the disclosure. Primary optics 24, one for each LED array, are supported by frame 28. Each primary optic 24 is fitted with a central spill light blocker 26. Central spill light blocker 26 is an opaque mask applied over the central region of primary optics 24. Central spill light blocker 26 may be silk screened ink, or a physical disc made of paper, plastic, molded plastic, metal or any other material, adhered to the center of the primary optics 24. Central spill light blocker 26 may be a thin component as shown in the figures, or may have a tangible thickness or height, where the thickness provides additional spill light masking. Primary optics 24 is most commonly a TIR (Total Internal Reflection) optical lens designed to collimate the output of the associated LED array and produce a narrow output beam. Such TIR optics tend to produce spill light outside of the desired output beam, much of which passes through the central portion of the output face of the optic. By blocking that central portion with central spill light blocker 26, much of this spill light may be removed from the output beam, leaving only the narrow beam desired. The central spill light blocker 26 will reduce the overall efficiency of the optical system, but ensures that more of the light produced is within the desired beam angle. The opaque mask may be primarily absorptive. In alternative embodiments the mask may be reflective. If reflective, the mask may be planar; however, in some preferred embodiments the reflective mask would be non-planar. Each primary optics 24 is fitted with a key peg 30 which engages in a corresponding key slot 34 at the side of the mounting hole 32 in frame 28.

Figure 5:
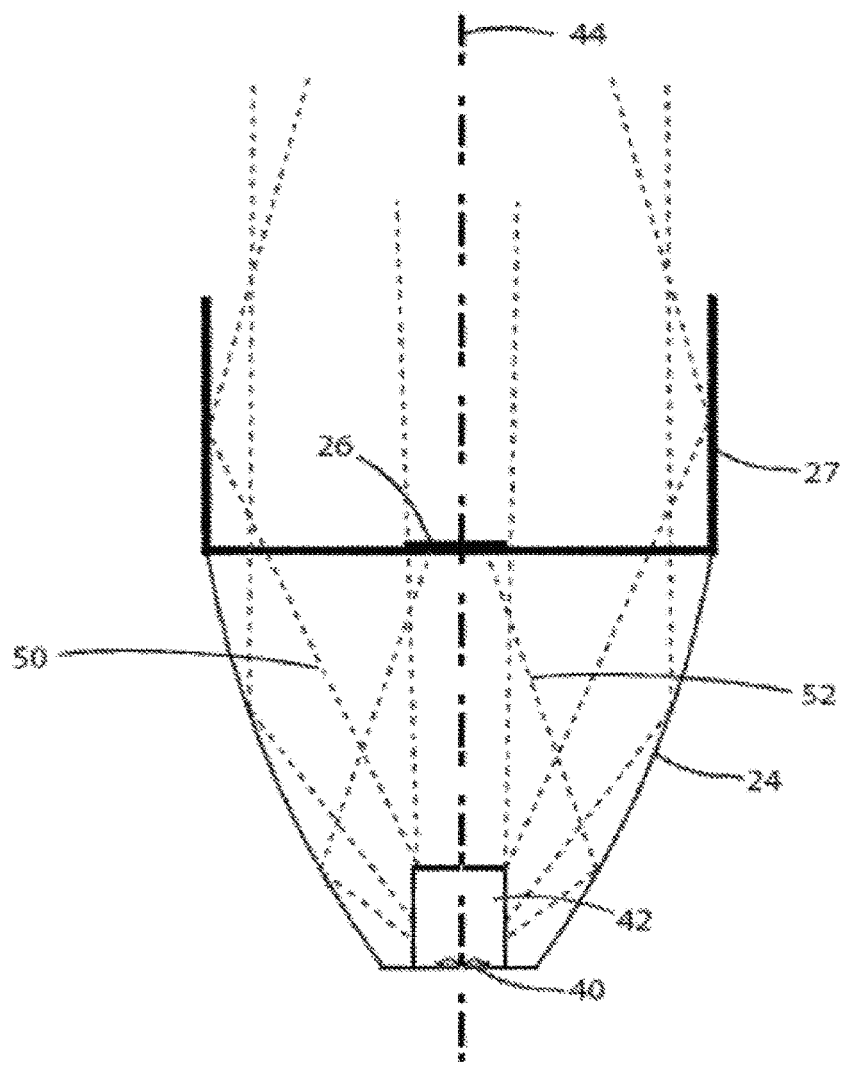
FIG. 5 illustrates operation of the various optical elements of the luminaire as they relate to a single LED module of an embodiment of the disclosure.

FIG. 5 illustrates operation of the various optical elements of the luminaire as they relate to a single LED module of an embodiment of the disclosure. The light output from an LED module 40, which may contain multiple LEDs of the same or differing colors, enters primary optics 24 via a receiving orifice 42. Dotted line 44 indicates an optical axis of the optical elements of the luminaire. Primary optics 24 provides beam collimation and may be a reflector or a lens utilizing total internal refection (TIR). As illustrated in this embodiment, the primary optics 24 is generally parabolic in shape and the receiving orifice 42 is generally located proximate to the focus of the parabolic shape. After passing through and being constrained by primary optics 24, the light beam is further constrained by a set of louver masks as disclosed and described in U.S. Patent Application Publication No. 2010/0103663. It is advantageous in such systems to provide a louver mask system adjacent to the light source such that differing colors of LEDs are constrained to similar output areas and thus minimize color fringing and spill light. Small louver mask 27 is part of the system which provides this function.

Because LED module 40 is not a true point source, primary optics 24 will tend to also produce stray light rays that are outside the desired output beam angle. Such rays 52, for example in FIG. 5, tend to be emitted through the central portion of the output face of primary optics 24. Central spill light blocker 26 is placed over this central region so as to block many of these stray light rays and prevent them from reaching the output beam. Light rays 50 that are within the desired beam angle, for example in FIG. 5, miss the central spill light blocker 26 and continue through the optical system.

Figure 6:
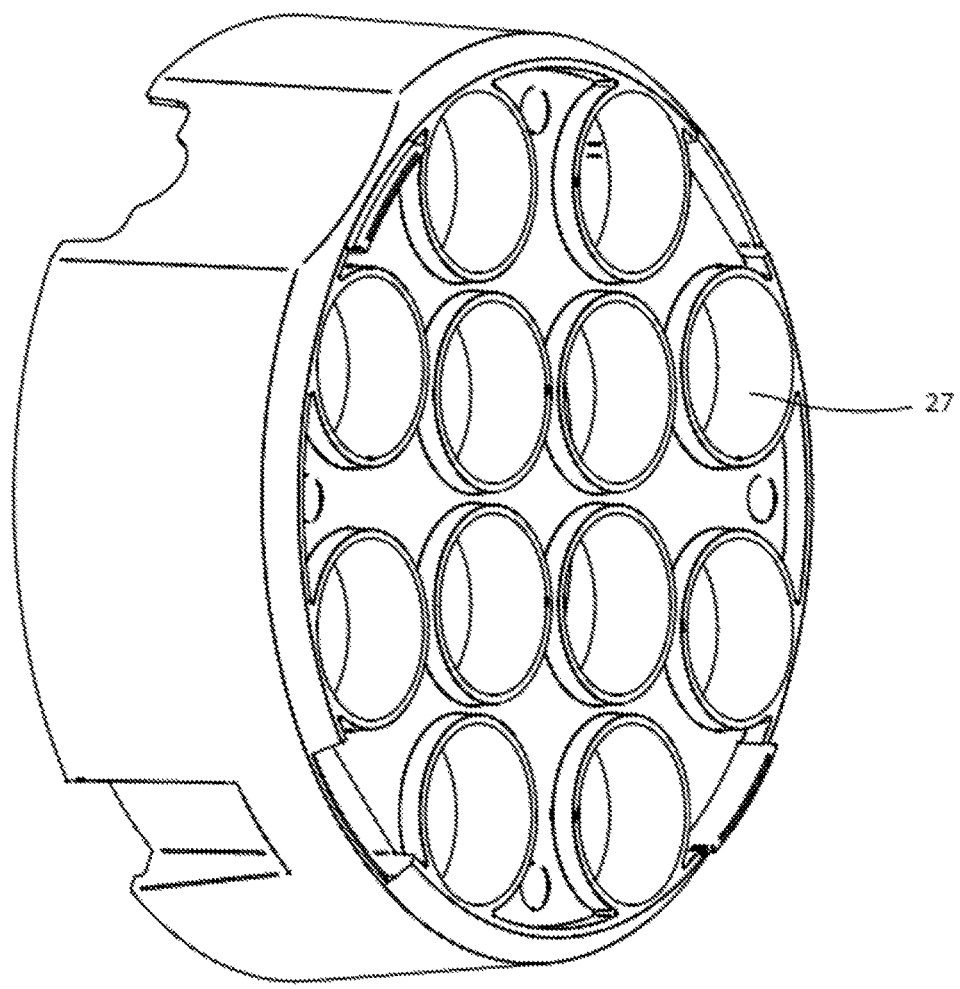
FIG. 6 illustrates an array of small louver masks of an embodiment of the disclosure.

FIG. 6 illustrates an array of small louver masks 27 of an embodiment of the disclosure. Each louver mask 27 aligns with its associated LED array and primary optics 24. As the array of small louver masks 27 is manufactured as a single component, it may easily be replaced in order to provide different height louver masks for all LEDs simultaneously.

Figure 7:
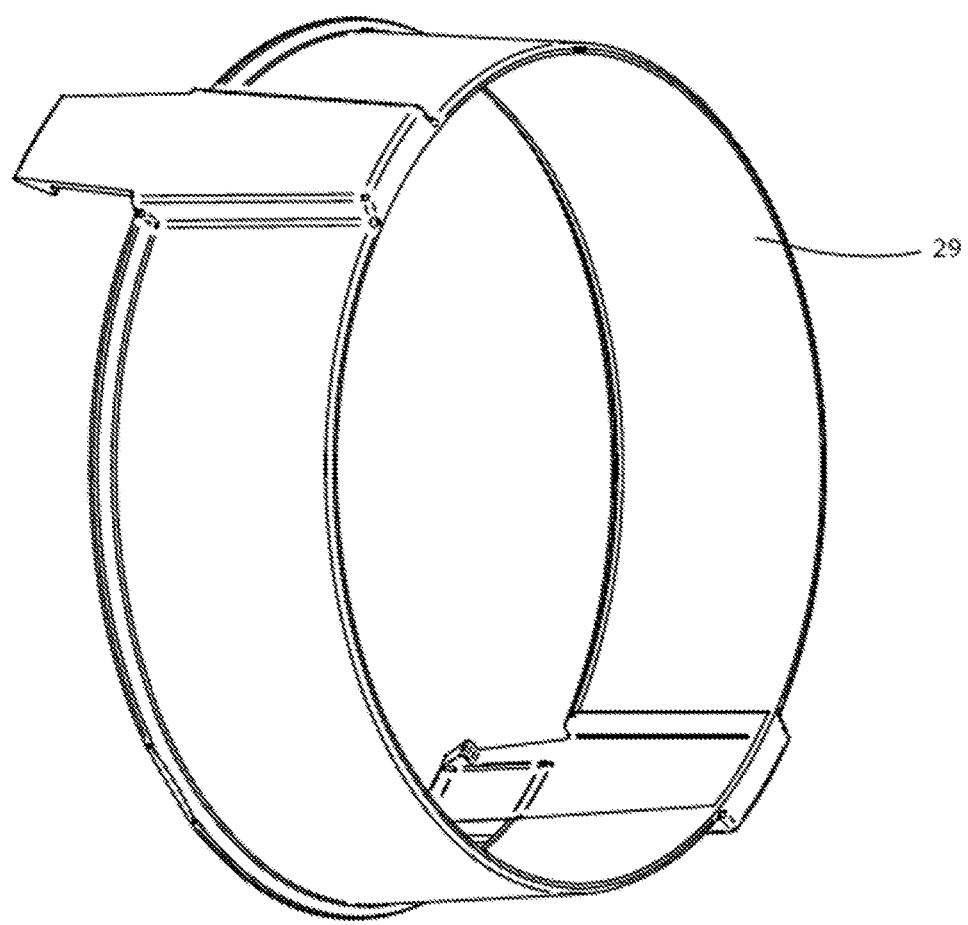
FIG. 7 illustrates a top-hat module of an embodiment of the disclosure.

FIG. 7 illustrates a top-hat module of an embodiment of the disclosure. The top-hat module 29 provides a further optional, level of spill light control, in addition to the small louver masks 27 and central spill light blockers 26.

Figure 8:
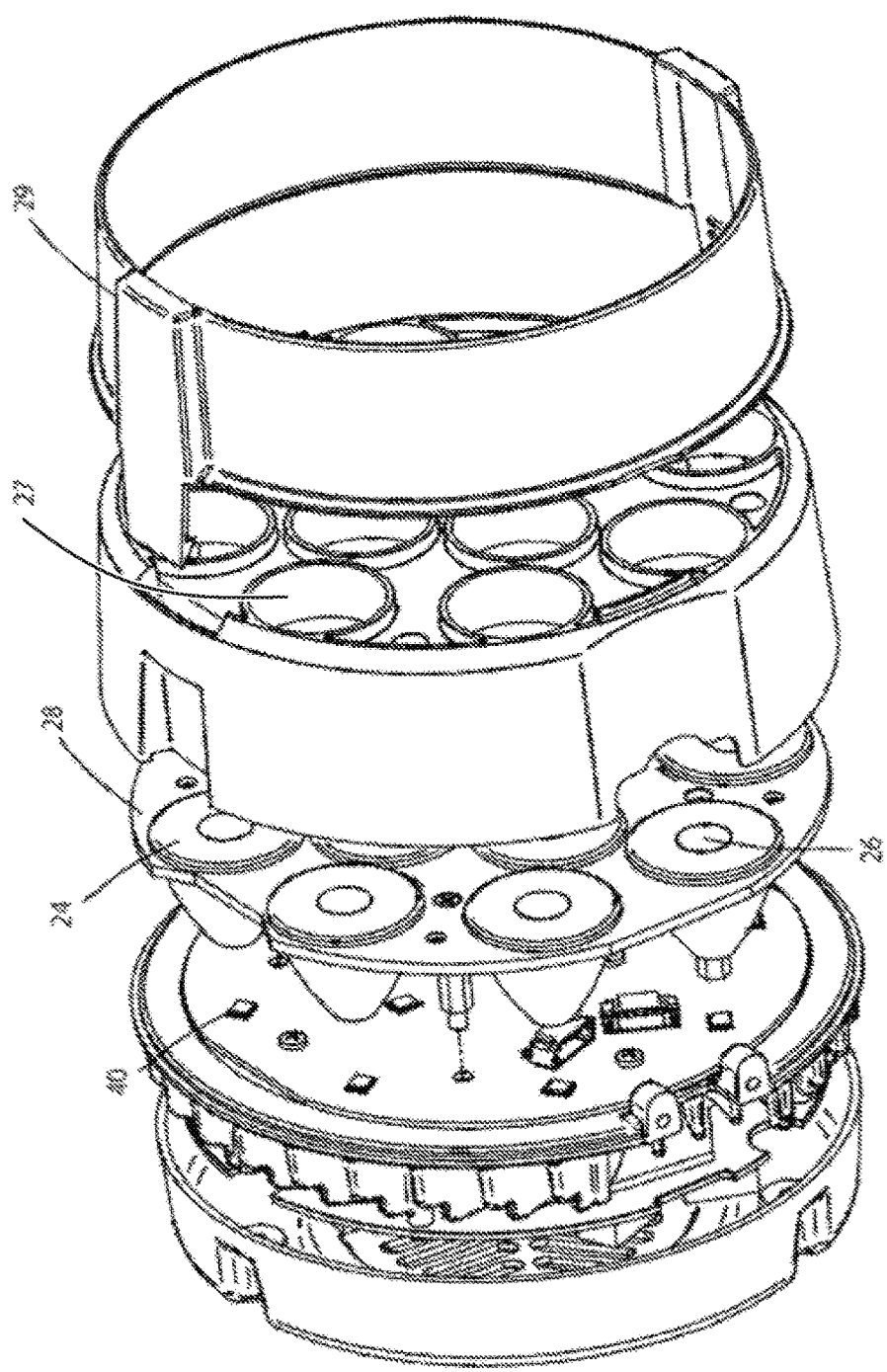
FIG. 8 illustrates an exploded diagram of an embodiment of the disclosure when fitted with the optional top-hat module.

FIG. 8 illustrates an exploded diagram of an embodiment of the disclosure when fitted with the optional top-hat module. From left to right individual LED module(s) 40 is/are paired with primary optic(s) 24, which in turn is/are fitted with individual central spill light blockers 26, and is/are paired with an array of small louver masks 27. Optional top-hat module 29 is fitted to the front of the system. In the embodiment illustrated in FIG. 8, the LED modules 40 are configured in an array.

In various embodiments, each LED module 40 may comprise a single LED die of a single color or a group of LED dies of the same or differing colors. For example in one embodiment LED module 40 may comprise one each of a Red, Green, Blue, and White LED die. In further embodiments LED module 40 may comprise an LED chip or package while in yet further embodiments LED module 40 may comprise multiple LED chips or packages, either under a single primary optic or each package with its own primary optic. In some embodiments these LED die(s) may be paired with optical lens element(s) as part of the LED module. Though the LED modules 40 shown are illustrated as individual pieces, in various embodiments the LED modules 40 may be set out in an array of multiple modules as one piece or multiple pieces. Similarly, the primary optics 24 are illustrated as one piece per LED module. In other embodiments the primary optics 24 may be configured in an array of multiple primary optics to be paired with an array of multiple LED modules.

In one embodiment of the disclosure every small louver mask 27 on each module in the luminaire is identical but in further embodiments the louver masks 27 may differ within a single module or between different modules across the luminaire. In yet further embodiments the height of louver masks 27 may be varied to effect different controlled beam angles for the emitted light. Such combinations of differing optical elements and louver array height may be advantageously chosen so as to allow fine control of the beam shape and quality. The louver mask arrays reduce color fringing or halation and control the beam angle to provide the lighting designer with a well controlled and defined beam of a single homogeneous color.

It can be seen that changing the heights of louver masks 27 will alter the constrained beam angle of the output beam. A taller louver will produce a narrower beam and a shorter louver will produce a wider beam. The louver masks 27 may be of fixed height or may be adjustable. Louver masks 27 may advantageously be non-reflective so as to avoid spill light, this may be achieved by painting or coating the louver mask with matte black paint, anodizing, or other coating as known in the art.

In a further embodiment louver masks 27 may be translucent or transparent to produce a glow effect within the face of the luminaire.

LED module 40 may contain LEDs of a single color and type or of multiple colors. The disclosure is not limited by the number, colors, or types of LEDs used and is applicable with any layout of any number of any type and any color of LEDs or Organic LEDs (OLEDs).

Figure 9:
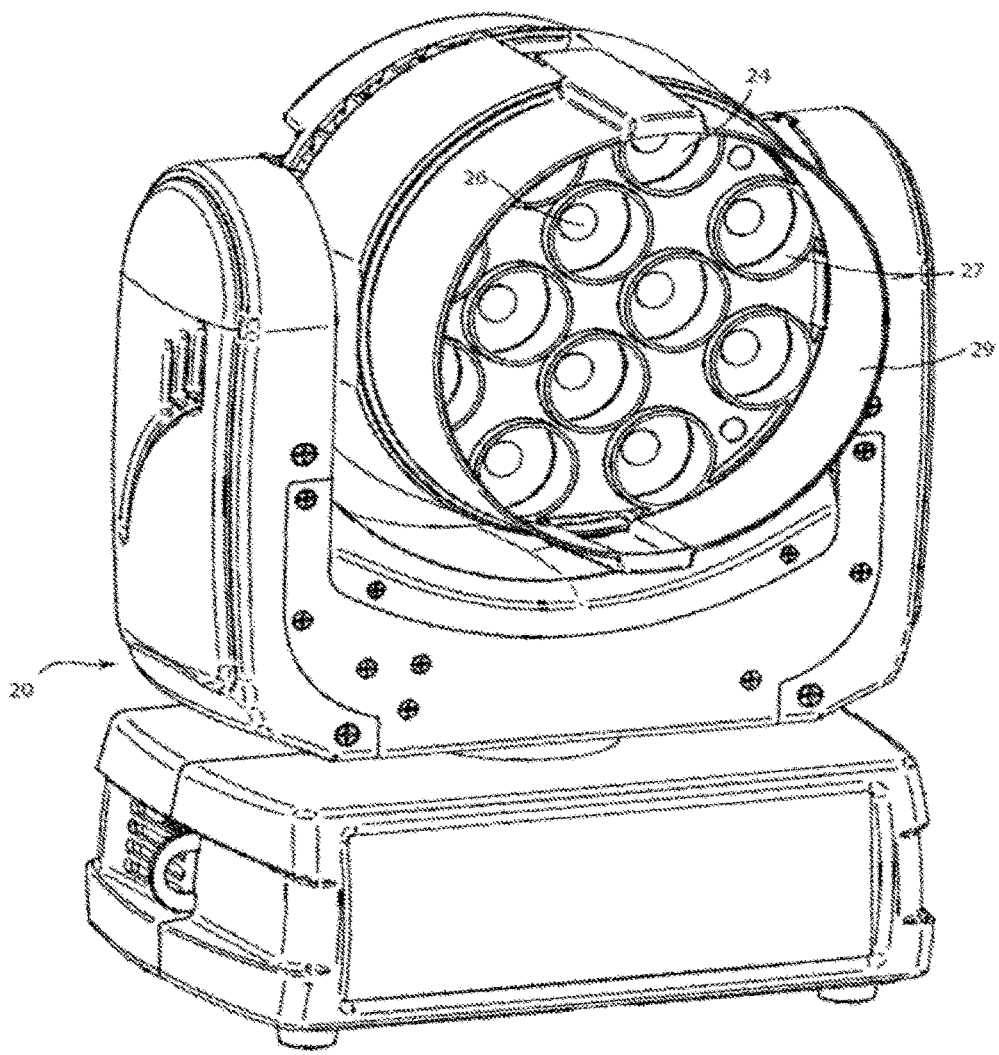
FIG. 9 illustrates an embodiment of the disclosure as fitted to an automated luminaire.

FIG. 9 illustrates an embodiment of the disclosure as fitted to an automated luminaire. Luminaire 20 contains multiple LED modules each of which is fitted with primary optics 24, central spill light blocker 26, and small louver masks 27. This embodiment is also fitted with optional top-hat module 29. The top-hat module 29 provides a further optional, level of spill light control, in addition to the small louvers and central spill light blockers.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An automated luminaire, comprising:
   an array of light emitting diode (LED) modules;
   an array of total internal reflection (TIR) optics corresponding to the array of LED modules and optically coupled to the array of LED modules, wherein each TIR optic comprises:
      a reflective surface that has a focus;
      a receiving orifice, wherein the receiving orifice is positioned proximate to the focus and is configured to receive light rays emitted by its associated LED module;
      an output face, configured to pass light rays emitted from the TIR optic; and
      a central light block configured to intersect an optical axis of the TIR optic, to cover a central region of the output face, and to block received LED module light rays that are reflected from the reflective surface and have a beam angle that is greater than a desired output beam angle of light emitted from the TIR optic, wherein the central light block comprises a material that is adhered to a center of the output face; and
   an array of louvers corresponding to the array of TIR optics, wherein each louver is configured to align with the output face of its associated TIR optic, and wherein each louver is configured to block light rays emitted from its associated TIR optic with a beam angle that is greater than the desired output beam angle.

2. The automated luminaire of claim 1, wherein the central light block of at least one TIR optic is substantially light absorptive.

3. The automated luminaire of claim 1, wherein the central light block of at least one TIR optic is planar and substantially light reflective.

4. The automated luminaire of claim 2, wherein the central light block of at least one TIR optic is planar.

5. The automated luminaire of claim 2, wherein the central light block of at least one TIR optic is non-planar.

6. The automated luminaire of claim 1, wherein, for each TIR optic, its reflective surface is substantially parabolic and its receiving orifice is located proximate to the focus of the reflective surface.

7. The automated luminaire of claim 1, further comprising a top hat module configured to receive light passing through the array of louvers and to block light rays passing through the array of louvers with a beam angle that is greater than a second desired output beam angle of light emitted from the automated luminaire.

8. The automated luminaire of claim 1, wherein at least one LED module comprises a group of LED dies.

9. The automated luminaire of claim 8, wherein the group of LED dies comprises LED dies of differing colors.

10. An automated luminaire, comprising:
    a plurality of light emitting diode (LED) modules;
    a corresponding plurality of reflective optics optically coupled to the plurality of LED modules, wherein each reflective optic comprises:
       a receiving orifice;
       an output face, configured to pass light rays emitted from the reflective optic; and
       a central light block,
       wherein the receiving orifice is configured to receive light rays emitted by its associated LED module, and wherein the central light block is configured to intersect an optical axis of the reflective optic, to cover a central region of the output face, and to block received LED module light rays that are reflected within the reflective optic and have a beam angle that is greater than a desired output beam angle of light emitted from the reflective optic, wherein the central light block comprises a material that is adhered to a center of the output face and a plurality of louvers corresponding to the plurality of reflective optics, wherein each louver is configured to align with the output face of its associated reflective optic, and wherein each louver is configured to block light rays emitted from its associated reflective optic with a beam angle that is greater than the desired output beam angle.

11. The automated luminaire of claim 10, wherein at least one reflective optic is a solid total internal reflection (TIR) optic.

12. The automated luminaire of claim 10, wherein at least one reflective optic comprises a substantially parabolic reflective surface.

13. The automated luminaire of claim 10, wherein the light block of at least one reflective optic is substantially light absorptive.

14. The automated luminaire of claim 10, wherein the light block of at least one reflective optic is substantially light reflective.

15. The automated luminaire of claim 14, wherein the light block of at least one reflective optic has a planar surface facing its associated LED module.

16. The automated luminaire of claim 14, wherein the light block of at least one reflective optic is non-planar.

17. The automated luminaire of claim 10, further comprising a top hat module configured to receive light passing through the plurality of louvers, wherein the top hat module is configured to block light rays passing through the plurality of louvers with a beam angle that is greater than the desired output beam angle.

18. The automated luminaire of claim 10, wherein at least one LED module comprises a group of LED dies.

19. The automated luminaire of claim 18, wherein the group of LED dies comprises LED dies of differing colors.

* * * * *